United States Patent
Humpal et al.

(10) Patent No.: US 6,892,124 B2
(45) Date of Patent: May 10, 2005

(54) ADJUSTABLE AXLE CONTROL (75) Inventors: Richard Allen Humpal, Ankeny, IA (US); Jack Conan Anderson, Madrid, IA (US)

(73) Assignee: Deere & Company, Moline, IL (US)

( * ) Notice: Subject to any disclaimer, the term of this patent is extended or adjusted under 35 U.S.C. 154(b) by 105 days.

(21) Appl. No.: 10/631,232

(22) Filed: Jul. 31, 2003

(65) Prior Publication Data

US 2005/0027421 A1 Feb. 3, 2005

(51) Int. Cl.$^7$ .............. B60B 35/10; G06F 19/00
(52) U.S. Cl. .............. 701/50; 280/638; 280/209
(58) Field of Search .............. 701/1, 36, 50; 280/638; 340/438; 180/209, 906; 301/128

(56) References Cited

U.S. PATENT DOCUMENTS

| 4,828,071 A | * | 5/1989 | Gaede | 180/291 |
|---|---|---|---|---|
| 5,282,644 A | | 2/1994 | Larson | 280/638 |
| 5,454,583 A | | 10/1995 | Torborg | 280/638 |
| 5,489,113 A | * | 2/1996 | Torborg | 280/638 |
| 6,139,045 A | | 10/2000 | Vandenbark et al. | 280/638 |

* cited by examiner

*Primary Examiner*—Michael J. Zanelli (57) ABSTRACT

An activating portion on one section of an adjustable wheel assembly triggers a proximity switch on a vehicle such as a field sprayer to provide a signal indicative of wheel tread. The signal is sent to a controller which controls wheel tread adjustment. Two or more assemblies may be adjusted simultaneously reduce adjustment time. The operator control is located in the vehicle cab for entering wheel spacings, providing an indication of the actual spacing and individual wheel position, and providing error and warning messages. An interlock system prevents axle telescoping unless certain vehicle conditions are satisfied, such as the vehicle speed being below a preselected point and vehicle being in the field mode.

20 Claims, 11 Drawing Sheets

ADJUSTABLE AXLE CONTROL

FIELD OF THE INVENTION

The present invention relates generally to adjustable axles for vehicles, and, more specifically, to an adjustable axle control system for wheel spacing adjustments on agricultural implements such as field sprayers.

BACKGROUND OF THE INVENTION

Adjustable axle assemblies are commonly utilized to adjust wheel spacing in agricultural vehicles for numerous reasons including the accommodation of a variety of row spacings and the following of specified wheel track patterns. Examples of such structures are shown in U.S. Pat. Nos. 6,139,045; 5,454,583; and 5,282,644. Although various devices for determining and setting axle position have been available, providing repeatable and reliable wheel spacing adjustments in a user-friendly manner with adequate interlocks to assure adjustments are made only under proper operating conditions has been a continuing source of problems. Some systems require the operator to read indicia on or adjacent the adjustable axle and are inconvenient to use. Others require each axle assembly to be adjusted separately which is a time-consuming process on vehicles having numerous axle assemblies.

SUMMARY OF THE INVENTION

It is therefore an object of the present invention to provide an improved system for determining and setting axle position on a vehicle with an adjustable axle. It is a further object to provide such a system which overcomes most or all of the problems associated with previously available wheel spacing systems.

It is another object of the present invention to provide an improved system for determining and setting axle position on an adjustable axle vehicle which is easy to operate and which provides reliable feedback so the operator can readily determine axle adjustment and make changes in wheel spacing from the operator station of the vehicle. It is a further object to provide such a system which facilitates adjustment of two or more axle assemblies at one time to reduce the time necessary for completing the vehicle tread adjustment.

It is still another object of the present invention to provide a system for determining and setting axle position on an adjustable axle vehicle having an improved structure for indicating the amount of axle telescoping. It is a further object to provide such a system having an improved interlock system.

In the embodiment shown, a strap on the side of a telescoping axle knee includes spaced portions which trigger or activate a sensor or switch attached to the mainframe axle for each adjustable axle assembly on a vehicle such as a field sprayer. Each spaced portion represents a preselected distance of travel allowing numerous wheel tread settings between the maximum and minimum spacings. Telescoping of the assemblies is controlled by a chassis controller, and two or more assemblies may be adjusted simultaneously if desired to reduce adjustment time. The operator control is located in the vehicle cab for entering wheel spacings and includes a readout providing a convenient indication of the actual spacing and individual wheel position. The readout also provides error and warning messages. An interlock system prevents axle telescoping unless certain vehicle conditions are satisfied, such as vehicle speed below a preselected point and vehicle in the field mode. Failed sensor indications or indications that the telescoping axle fails to fully extend or retract are also provided. The control includes a reset feature for easily calibrating tread adjustment when the axles are telescoped to a limit position. The operator control is easy to understand and operate, and the readout provides a clear indication of the state of all the telescoping axle assemblies. Warning and error messages help the operator to quickly diagnose system problems.

These and other objects, features and advantages of the present invention will become apparent from a reading of the detailed description below in view of the drawings.

DESCRIPTION OF THE PREFERRED EMBODIMENT

Figure 1:
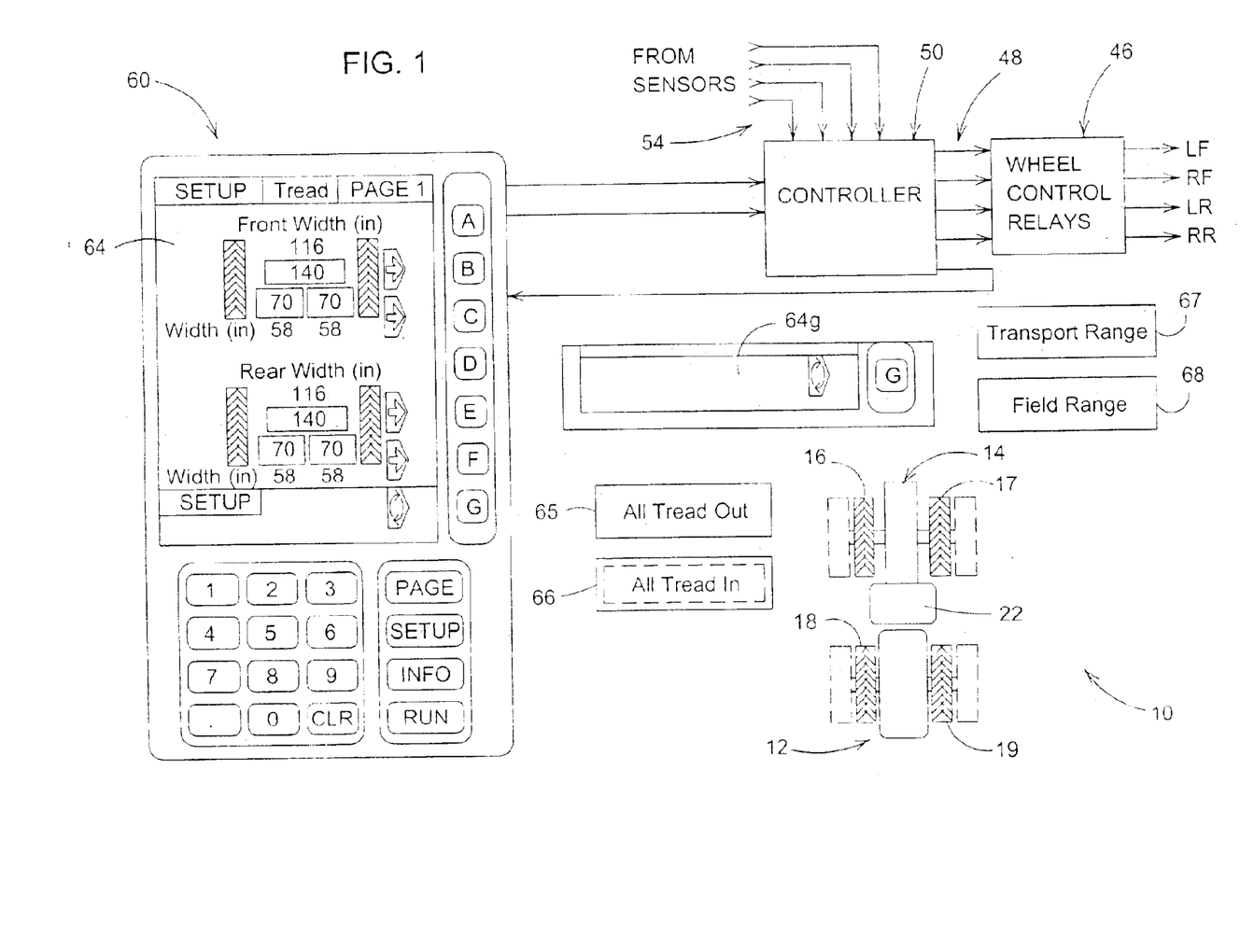
FIG. 1 is a schematic representation of the user input and display device and controller for an adjustable axle vehicle.

Referring now to FIG. 1 therein is shown a control and display system 10 for a vehicle such as a field sprayer shown schematically on the display at 12. The vehicle 12 includes a frame 14 supported for forward movement over the ground by left- and right-front (LF and RF) wheels 16, 17 and left- and right-rear (LR and RR) wheels 18, 19. An operator cab 22 is supported on the frame 14 between the wheels 16–19.

Figure 2:
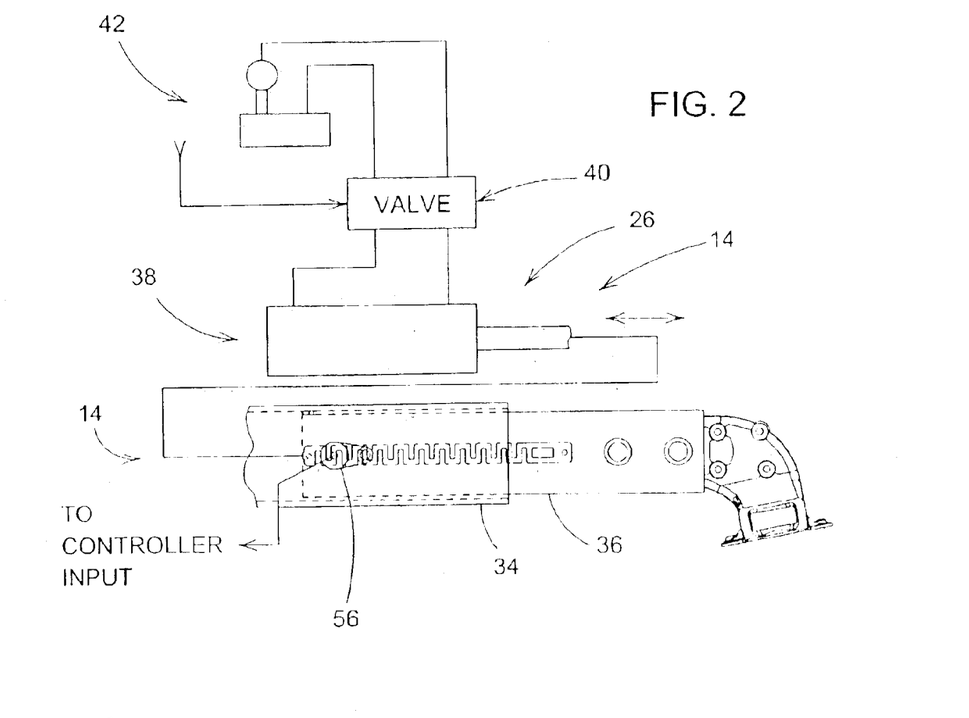
FIG. 2 is a view of a portion of an adjustable axle assembly for the vehicle showing a transducer and actuator structure for providing position signals to the controller circuit.

The wheels are supported by adjustable axle members 26 (FIG. 2) for movement over a range of tread positions between narrowed transport positions (solid lines of FIG. 1) and widely spaced positions (broken lines of FIG. 1). As shown in FIG. 2, the member 26 includes a first tubular member 34 extending outwardly from the frame 14, and a fabricated knee joint structure 36 supporting the corresponding wheel and having an inner tubular end telescopingly received within the member 34. Hydraulic cylinder or motor structure 38 extending between the frame 14 and the tubular member 36 and connected to electrohydraulic valve structure 40 is extendible and retractable to move the joint structure out and in to change the wheel tread.

The electrohydraulic valve structure 40 for each wheel is connected to a source 42 of hydraulic fluid under pressure and includes a control input 44 connected to wheel control relay structure 46. The relay structure 46 is connected to five low side driver outputs 48 of a main electronic controller 50 that power the individual relays of the structure 46. The controller 50 and relay structure 46 control the valves 40 to provide hydraulic tread adjust for the four wheels 16, 17, 18 and 19 in both independently and combined sequences described in further detail below. The controller 50 includes four sensor inputs 54 which receive signals from corresponding transducers or sensors 56 located at each of the adjustable axle members 26 to determine the current position of the tread. A control input and display device 60 includes outputs 62 connected to inputs of the controller 50 to provide request signals to the controller to move the wheels 16–19 outwardly or inwardly. The display device 60 may be the commercially available John Deere GreenStar Display having a screen 64 with menu driven commands that allow an operator to program information quickly. The display area allows viewing of operational data while on the go and utilizes audible tones to guide or alert users while operating the machine. The display 60 has a SETUP page mode for tread readout and adjustment (shown) wherein information such as actual front and rear tread widths can be displayed and desired tread widths can be entered and displayed. Messages are displayed on a message screen 64g.

The control and display device 10 includes all tread in and all tread out control switches 65 and 66 and vehicle transport range and field range control indicators or switches 67 and 68. The transport range control switch 67 will be activated when high speed operation of the vehicle is selected.

An activating device 70, shown as a single laser cut metal piece having upright raised activating portions 72 regularly spaced along the telescoping portion of a knee assembly 74, moves with the assembly 74 within an outer beam 76 of each of the adjustable axle members 26. The sensor 56 provides signals to the controller 50 as the axle members are adjusted in or out to vary the tread. The sensor 56 may be a proximity switch such as a hall effect transducer which senses each activating portion 72. As the portion moves into close proximity of the sensor 56, a pulse is provided to the input of the controller 50. The activating portions 72 represent a fixed axle travel distance, for example, one inch, so each pulse represents a predetermined tread increment. Wheel spacing for a pair of front or rear axle members 26 therefore may be determined by:

$$Tread = W_s + (S \times N_{(Left)}) + (S \times N_{(Right)})$$

where $W_s$ is the initial minimum tread, S is the spacing between the activating portions 72, and $N_{(Left)}$ is the number of pulses provided by the left transducer 56 and $N_{(Right)}$ is the number of pulses to the input 54 of the controller 50 as the axle members 26 are adjusted outwardly. For example, a field sprayer may have tread settings at 115 inches for transport, and $(120 + (S \times N_{(Left)}) + (S \times N_{(Right)}))$ inches from 120 inches up to 160 inches total tread setting. An elongated slot at 78 provides a longer first increment (2.5 inches for the above example).

The controller 50 controls the hydraulic tread adjust of the four axle members in both independent and combined sequences. In one arrangement, the user can adjust the tread of any of the four wheels using the SETUP page of the display device 60. Each wheel 16–19 is movable outwardly independently of the other wheels, but all four wheels will move inwardly at the same time under the operation of the controller 50 and the valve structure 40.

Referring to FIGS. 4–9, therein are shown flow charts for the programmed operation of the controller 50. Upon startup 200 and first power up 202 the initial position settings are set to zero at 204. If a startup/reboot is determined at 206, the previous tread adjustments values are read from a non-volatile memory into the random access memory of the controller 50 at 208.

Figures 4, 4A:
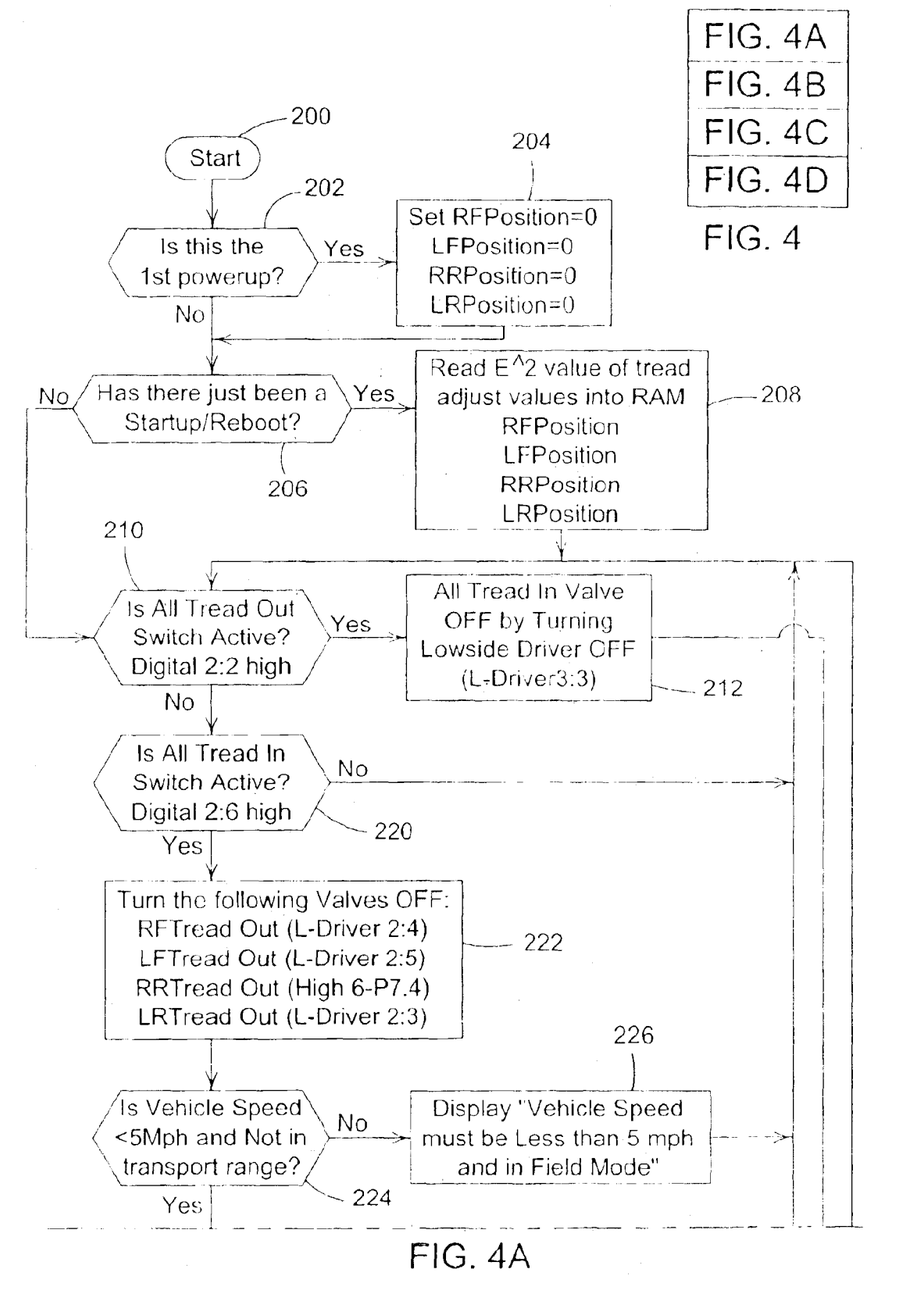
FIGS. 4A–4D is a controller flow chart for right front tread of the vehicle and for the tread in control.
Figure 4B:
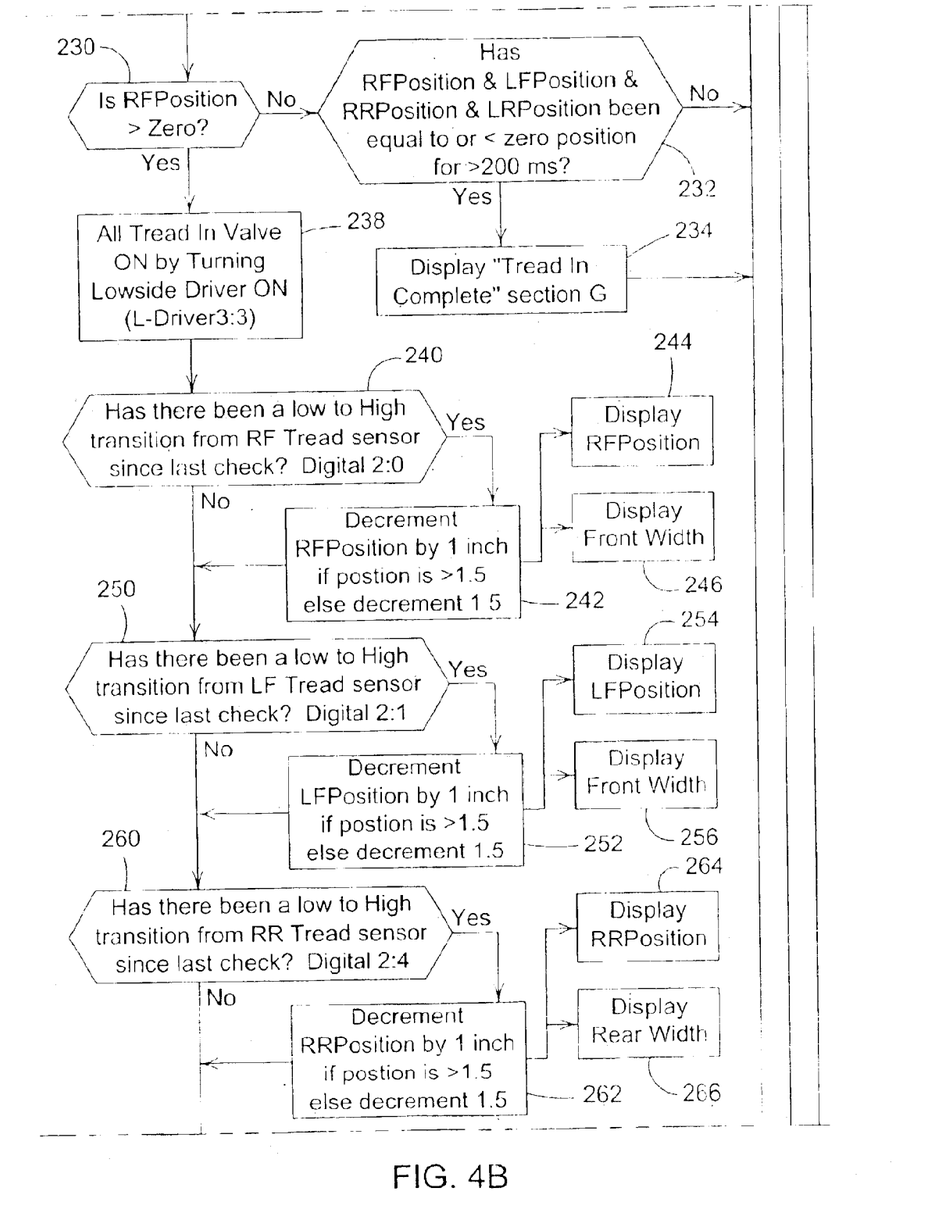

After the initialization steps 200–208, the tread out switch 65 is checked at 210, and if the switch 65 is active, the tread in valve control is turned off at 212, and vehicle speed and the condition of the control switches 67 and 68 are checked at 214 (FIG. 4C) before initiating any tread out movement of the assemblies 26. If the conditions of the switches 67 and 68 indicates the vehicle is operating in the transport mode, or if the vehicle speed is above a preselected maximum speed set for outward wheel adjustment (5 MPH), the device 10 displays a message informing the operator that the vehicle speed must be below the preselected speed and the vehicle must be in the field mode at 216. Control is then returned to 210 (FIG. 4A).

If the all tread out switch 65 is not active at 210, the all tread in switch 66 is polled at 220. If both the switches 65 and 66 are inactive, the switches are continually polled (210, 220) until one of the switches is activated. Upon activation of the all tread in switch 66, the valves controlling tread extension for the four assemblies 26 are immediately shut off at 222 and vehicle speed and vehicle mode are checked at 224. If transport mode operation or vehicle speed greater the preselected minimum speed is determined at 224, the device 10 displays the message informing the operator that the vehicle speed must be below the preselected speed and the vehicle must be in the field mode at 226 to adjust the tread, and control is again returned to 210.

Once the controller determines vehicle operating conditions are satisfactory for initiating wheel tread in adjustments at 224, the position of the right front wheel assembly 26 is checked at 230 to determine if right front position is at the fully in or zero position, and, if so, the remaining wheel assemblies 26 are checked for fully in conditions at 232. If all the remaining wheel assemblies have been fully in longer than a preselected time (0.2 seconds), the device 10 displays an all tread in completion message at 234 and control is returned to 210. If all the assemblies are not fully retracted at 232, control is again returned to 210.

If the right front position is greater than zero at 230, the all tread in valves are activated at 238, and if the right front tread sensor 56 has detected an activating portion 72 causing a low to high transition at the controller input 54 (240), the right front position indication is decreased. The decrease in the spacing indication will be S(=1 inch) unless the current indication less than 1.5 inches and the sensor 56 is adjacent the elongated slot 78. In that event, the decrease will be 1.5 inches resulting in a right front indication of zero. The present position and width indications are then updated on the display device 60 at 244 and 246. After the position update at 242, or if there has been no low to high transition at the right front sensor at 240, the remaining sensors are checked in turn (250, 260, and 270) and positions are decreased if necessary (252, 262 and 272). The display device 60 is updated (254, 256; 264, 266; and 274, 276) in similar fashion for each remaining wheel assembly. Thereafter control is again returned to 210.

Figure 4C:
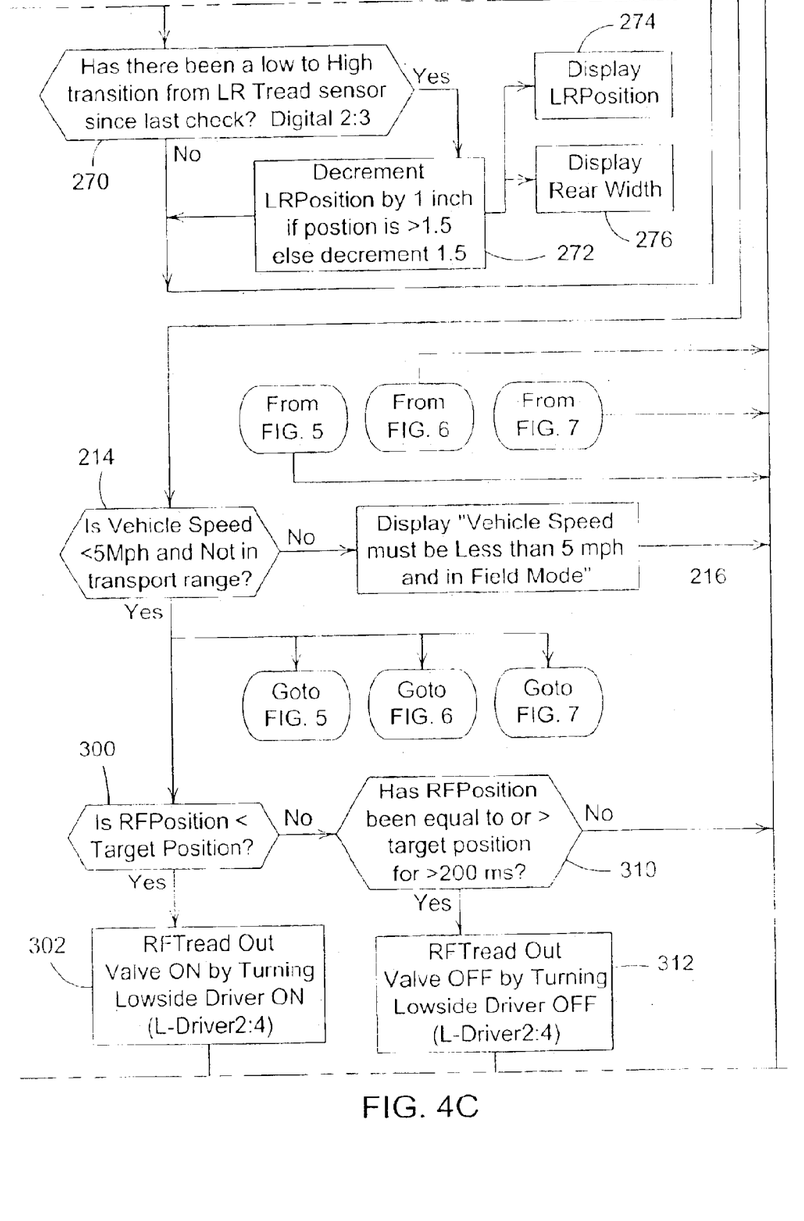

Assuming that the operator activates the all tread out switch (210 of FIG. 4A), the all tread in valves are shut off at 212 and vehicle speed and operation mode are checked at 214 (FIG. 4C). If speed is below the preselected speed and if the vehicle is not in the transport mode of operation, the tread out control of FIGS. 4C–4D and FIGS. 5–7 is initiated. The right front position is compared at 300 with the target right front position entered into the device 60 (FIG. 4C). If the actual position is less than target, the right front tread out valve is activated at 302 and the output of the right front sensor 56 is checked for a low to high transition since the last check. (304 of FIG. 4D). If such a transition has occurred, the right front position indication is increased one increment (one inch unless the present position is zero or the fully retracted position so that the initial low-high transition at the area 78 indicates a movement of 1.5 inches). The position indication on the display 60 is updated at 308. Control is returned to 210 after the update at 308 or if there has been no transition detected at 304, and the process is repeated. Once the right front position reaches or exceeds the target position for a preselected period of time (300 and 310 of FIG. 4C), the right front tread out valve is turned off at 312, and if the remaining wheel assembly positions are at or above their target positions for the preselected time at 314, a tread out completion message is provided on the display 64*g* and control is returned to 210.

Figure 4D:
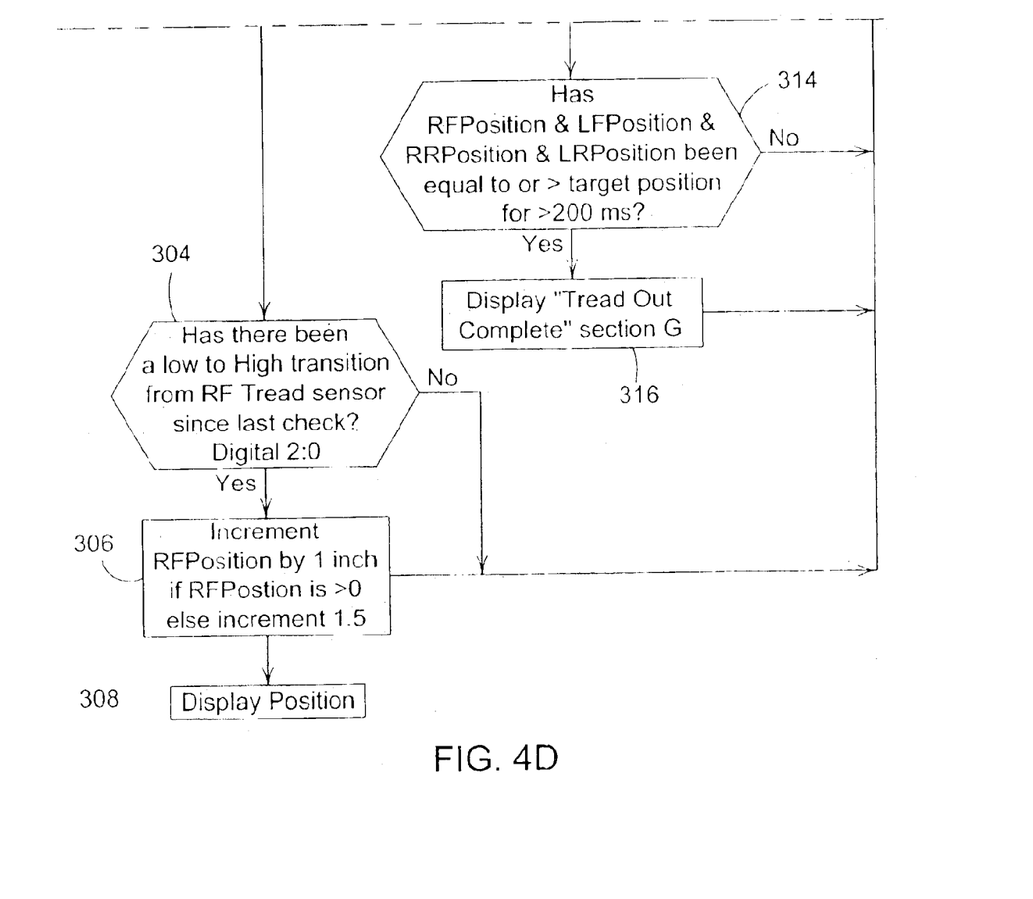
Figure 5:
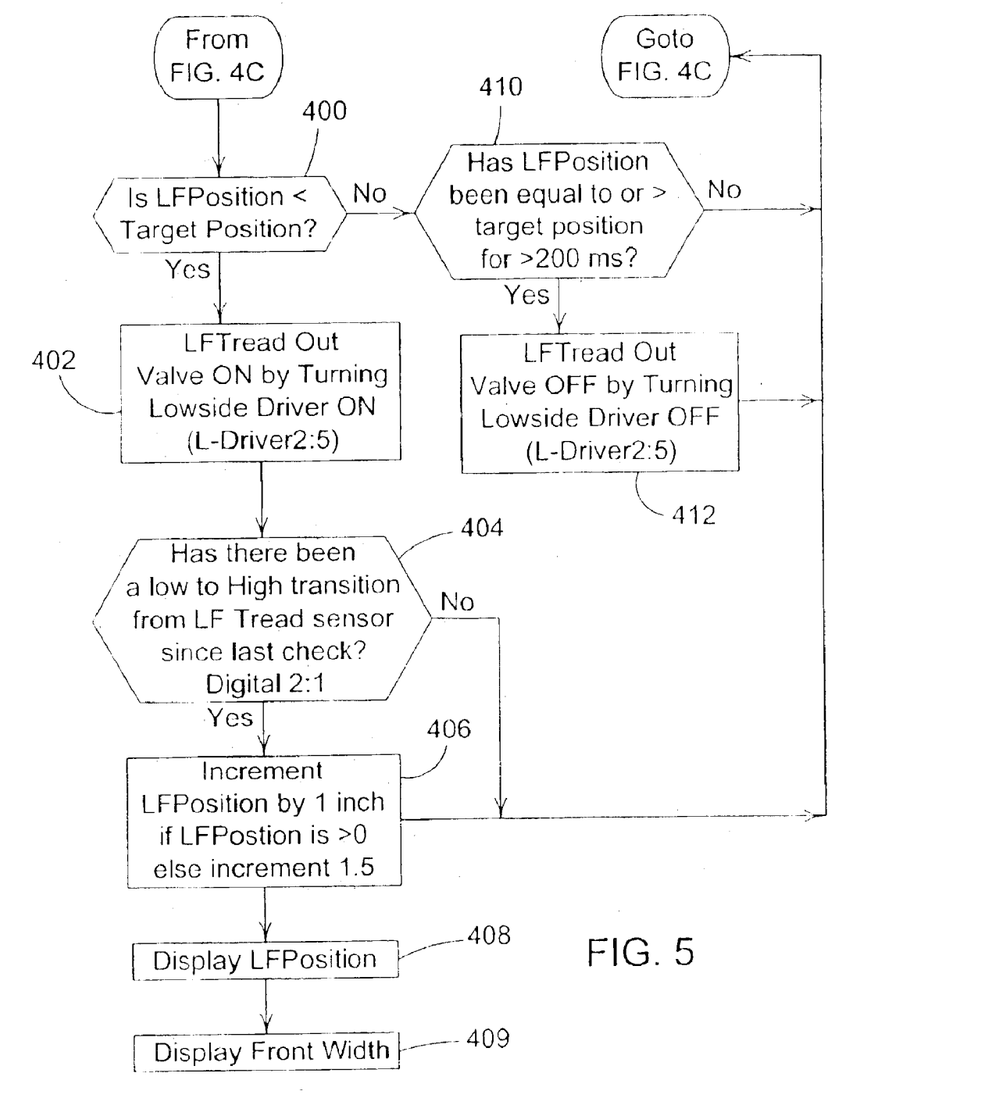
FIG. 5 is a flow chart illustrating the programmed operation of the left front tread out adjustment.
Figure 6:
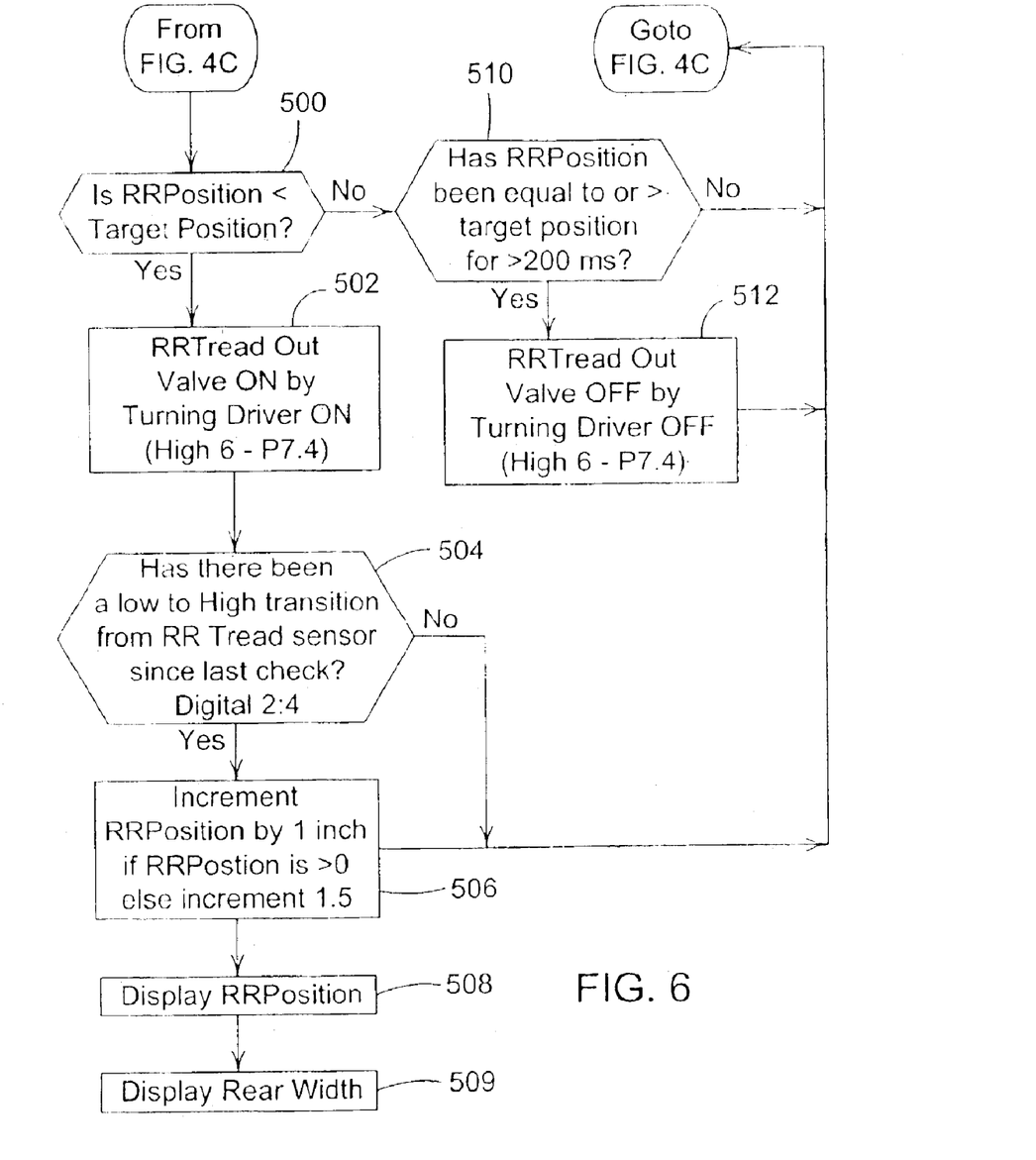
FIG. 6 is a flow chart illustrating the programmed operation of the right rear tread out adjustment.
Figure 7:
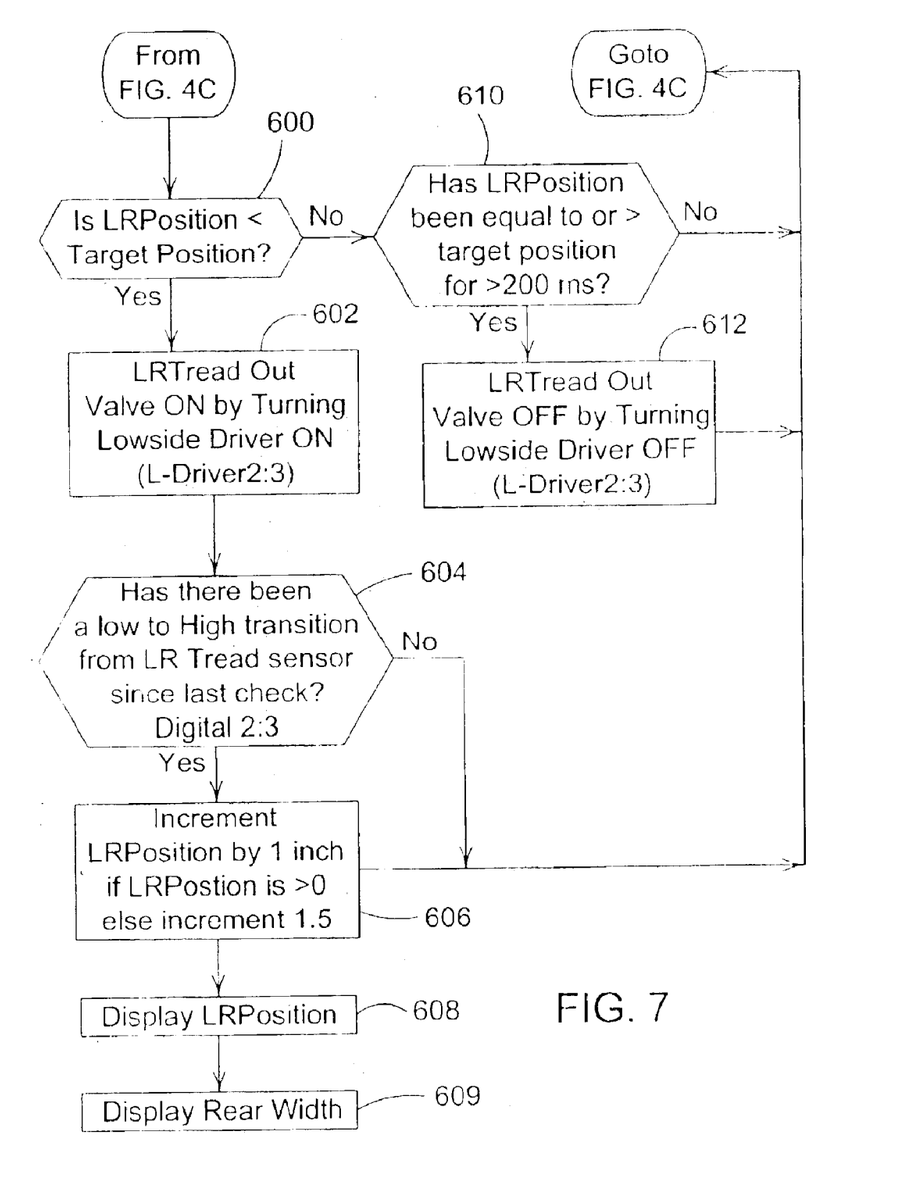
FIG. 7 is a flow chart illustrating the programmed operation of the left rear tread out adjustment.

The left front, right rear and left rear tread out control operations of FIGS. 5–7 are carried out simultaneously with the steps 300–316 of FIGS. 4C and 4D described above. Once the predetermined vehicle conditions are determined at 214, the target positions are compared with actual positions for the left front (400 of FIG. 5), the right rear (500 of FIG. 6), and the left rear (600 of FIG. 7). The control operations of FIGS. 5–7 are generally identical for each tread so only the left front tread out routine will be described in detail.

If the position determined at 400 is less than the target position indicating that the corresponding cylinder structure 38 needs to move the left front wheel outwardly, the left front valve is turned on at 402 and the controller checks for a recent sensor transition from low to high at 404. If there has been no transition, control is returned to 210 and the process begins again. However, if there has been a low to high transition since the last check, the left front position is incremented by one unit (one inch unless the present position is zero or the fully retracted position so that the initial low-high transition at the area 78 indicates a movement of 1.5 inches) at 406. The left front position is displayed at 408, the total front width is displayed at 409, and control is returned to 210. The right and left rear tread out control of FIGS. 6 and 7 include steps 500, 502, 504, 506, 508, 509, 510, 512 and 600, 602, 604 606, 608, 610, 612, respectively, generally identical to 400–412 described above. Once the wheel assembly positions are all at or above their target positions for the preselected time at 314 (FIG. 4D), a tread out completion message is provided on the display 64*g* and control is returned to 210.

When the operator is finished with a field, the all tread in switch 66 is activated and, provided the proper vehicle conditions are present, the controller 50 activates the relay and valve structure to telescope the knee joint structures 36 inwardly relative to the corresponding tubes 34 until the controller determines that the wheel tread is at the preselected minimum value. After transport, the all tread out switch 65 is activated, and the controller 50 causes the wheels to move outwardly, if the preselected vehicle conditions are met, until the desired spacings set on the device 60 are reached.

Figure 3:
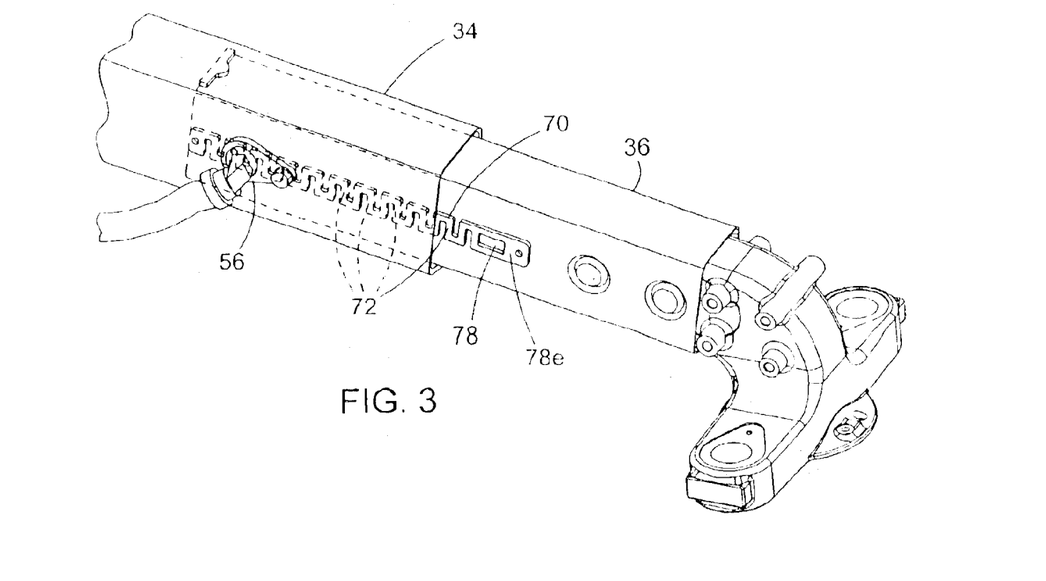
FIG. 3 is an enlarged perspective view of the telescoping portion of the axle assembly of FIG. 2.
Figure 8:
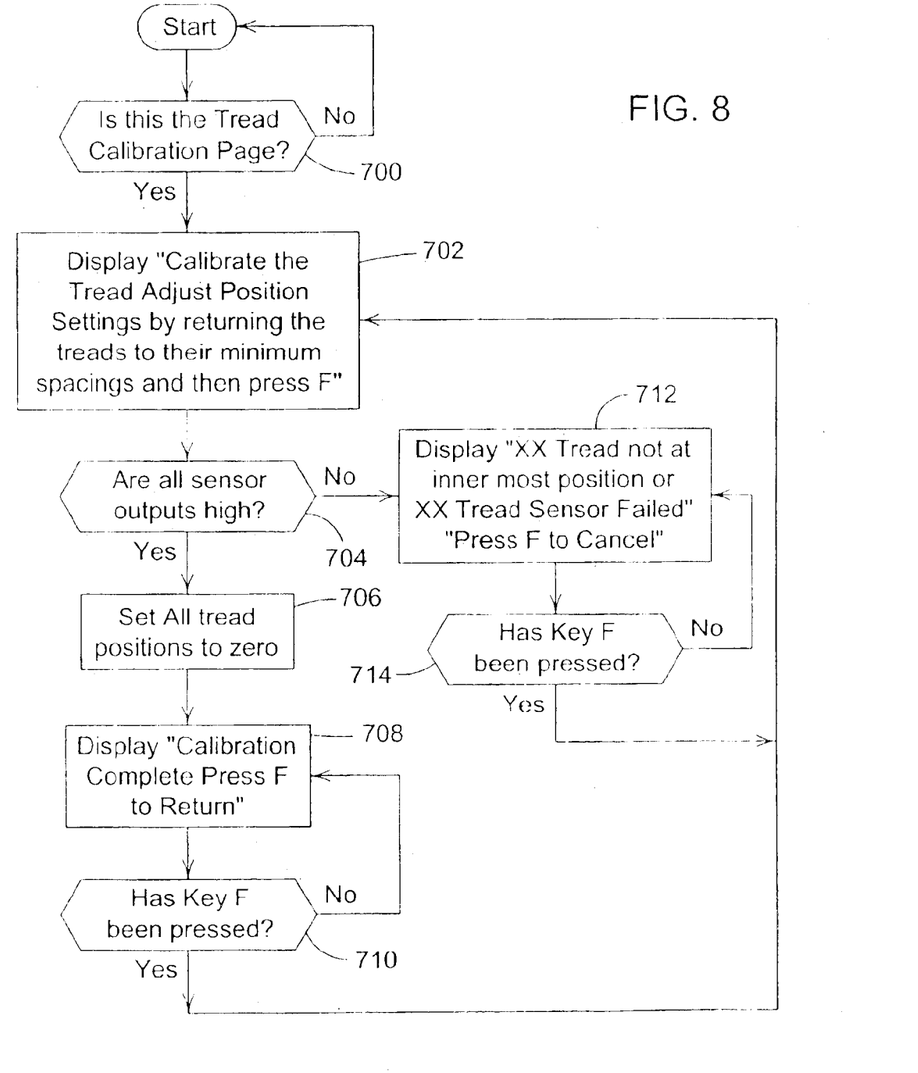
FIG. 8 is a flow chart illustrating the programmed operation of the tread adjust calibration.

The device 60 also includes a calibration page, and a calibration routine is initiated at 700 of FIG. 8 when the page is selected. A calibrate instruction message is provided at on the display 64*g* (702) with selection of the calibration page. The operator returns the treads to the minimum settings. The outermost end (78*e* of FIG. 3) of the activation device 70 will be adjacent the sensor 56 when the tread is minimized, and the sensor outputs are checked at 704 to see if the outputs are all high. If all sensor outputs are high, tread positions are set to zero at 706 and a calibration completed message is provided on the display 64*g* (708). Thereafter, the calibration complete message remains displayed until the page is changed on the display device 60 or the key F is pressed on the device (710) to return control to 702. If the key F is depressed, the calibration message at 702 is again displayed and the calibration routine begins again. If all sensor outputs are not high at 704, either the tread is not at the innermost position or a tread sensor 56 has failed and corresponding message is provide to the operator at 712. The message remains until the key F is pressed at 714.

Figure 9:
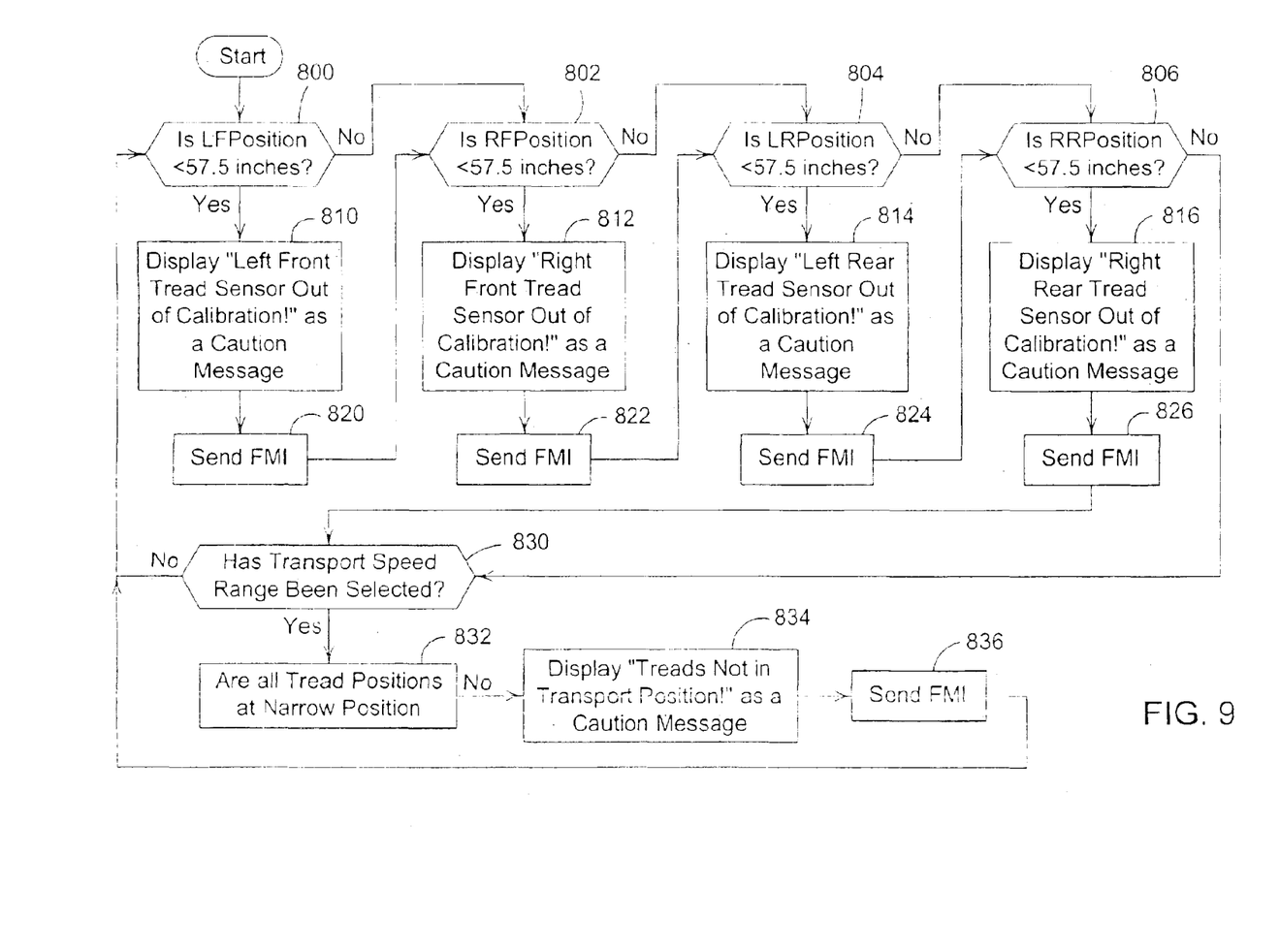
FIG. 9 is a flow chart illustrating the programmed operation for providing caution messages for tread sensor miscalibration and transport position.

FIG. 9 shows a flow chart illustrating the programmed operation for providing caution messages for tread sensor miscalibration and transport position. The routine of FIG. 9 runs continually after startup and checks each wheel position at 800, 802, 804 and 806. If any of the tread positions indicate a reading less than the minimum tread, a caution message is provided for the corresponding position at 810, 812, 814 or 816 and a fault message indication is sent (820, 822, 824 or 826) for that position. After all positions are checked, the selected transport speed range is checked at 830. If the transport range switch 67 is not active, control is returned to 800. If the transport speed range is selected, the tread positions are checked at 832. If all tread positions are not in the narrow position, a caution message is displayed at 834 and a fault message indication is provided at 836.

Having described the preferred embodiment, it will become apparent that various modifications can be made without departing from the scope of the invention as defined in the accompanying claims.

We claim:

1. In an agricultural vehicle having a frame supported for movement over the ground by at least two wheels and an operator cab, axle structure for mounting and adjustably spacing the wheels from the frame, the axle structure comprising:

at least one adjustable axle member supported from and movable relative to the frame for adjusting the spacing between the wheels;

a sensor providing a signal indicative of the movement of the adjustable axle member; and an electronic circuit connected to the transducer and responsive to the signal for providing a readout indicating wheel spacing.

2. The axle structure set forth in claim 1 wherein the sensor comprises a switch located adjacent to the adjustable axle member and switch actuating structure movable with the adjustable axle member.

3. The axle structure set forth in claim 2 wherein the sensor comprises a proximity switch, and the switch actuating structure comprises a plurality of spaced members located on the adjustable axle member.

4. The axle structure of claim 2 wherein the adjustable axle member comprises a first member telescopingly received within a second member, and wherein the sensor is supported from the second member and the first member includes uniformly spaced actuating structure, the actuating structure cooperating with the sensor to provide a pulse signal indicative of axle member movement.

5. The axle structure set forth in claim 1 including motor structure connected to the adjustable axle member and to the electronic circuit, wherein the electronic circuit comprises a controller having an input device for selecting desired wheel spacing, the motor structure responsive to the controller to automatically provide the selected wheel spacing.

6. The axle structure set forth in claim 5 wherein the controller includes a vehicle condition input, and wherein the controller activates the motor structure to change wheel spacing only upon detection of the presence of a preselected vehicle operating condition.

7. The axle structure set forth in claim 5 including a second adjustable axle member supporting a third wheel and connected to the motor structure, and wherein the controller automatically and simultaneously moves the first and second adjustable axle members to adjust the wheel spacing.

8. In an agricultural vehicle having a frame supported for movement over the ground by at least two wheels, and an operator cab supported by the frame, axle structure for mounting and adjustably spacing the wheels, the axle structure comprising:

a first adjustable axle member supported from and movable relative to the frame for adjusting the spacing between the wheels;

a transducer responsive to the movement of the first adjustable axle member and providing a signal indicative of the position of the first adjustable axle member;

an electronic controller responsive to the signal for providing a readout indicating wheel spacing, the controller including a control output; and motor structure connected to the first adjustable axle member and to the control output of the electronic controller for moving the first adjustable axle member relative to the frame.

9. The axle structure set forth in claim 8 including a display device located in the cab and connected to the controller providing an indication of the spacing of the wheels.

10. The axle structure set forth in claim 9 further wherein the controller includes a desired wheel spacing input, and the controller is responsive to the desired wheel spacing input to automatically operate the motor structure to provide desired wheel spacing.

11. The axle structure set forth in claim 9 wherein the controller includes an input for receiving a vehicle condition signal, and the controller is responsive to the vehicle condition signal to prevent operation of the motor structure under preselected vehicle operating conditions.

12. The axle structure set forth in claim 8 further comprising second, third and fourth adjustable axle members supported from the frame and connected to the motor structure, each of the first, second, third and fourth axle members supporting a ground engaging wheel, and wherein the motor structure is responsive to the electronic controller to simultaneously move a plurality of the adjustable axle members to adjust wheel spacing.

13. The axle structure set forth in claim 12 wherein the electronic controller includes an input device for selecting desired wheel spacing, and a readout device for providing an indication of the actual wheel spacing.

14. The axle structure as set forth in claim 8 wherein the first adjustable axle member includes index structure cooperating with the transducer to provide a signal in response to movement of the first adjustable axle member.

15. The axle structure set forth in claim 14 wherein the transducer comprises a non-contact transducer, and the index structure comprises regularly spaced transducer exciting members providing a signal to the controller as the first adjustable axle member is moved.

16. The axle structure as set forth in claim 14 wherein the index structure provides a pulsed signal, the number of pulses provided dependent on amount of movement of the first adjustable axle member.

17. In a vehicle having a frame supported for movement over the ground by at least two wheels, axle structure for mounting and adjustably spacing the wheels, the axle structure comprising:

an adjustable axle member supported from and movable relative to the frame for adjusting the spacing between the wheels;

a transducer supported adjacent the adjustable axle member and providing a signal indicative of the movement of the adjustable axle member;

an electronic controller connected to the transducer and responsive to the signal for providing a readout indicating wheel spacing, the controller including a control output; and a motor member connected to the adjustable axle member and to the control output of the electronic controller for moving the adjustable axle member relative to the frame.

18. The axle structure as set forth in claim 17 wherein the controller includes a vehicle condition input for receiving a vehicle condition signal, and wherein the electronic controller is responsive to the vehicle condition signal for limiting movement of the adjustable axle member under preselected vehicle operating conditions.

19. The axle structure as set forth in claim 17 wherein the controller includes means for checking wheel spacing for at least one limit position and providing an error signal if the checked wheel spacing is outside a range of acceptable wheel spacings for the limit position.

20. The axle structure as set forth in claim 17 including a plurality of simultaneously adjustable axle members, wherein the readout includes a desired wheel spacing input for operator entry of wheel spacing settings and the controller is responsive to the wheel spacing settings for moving the plurality of adjustable axle members.

* * * * *